G. MATRICARDI.
APPARATUS FOR CONNECTING ARTICLES TO BE TRANSPORTED TO A TRAVELING ROPE OR CHAIN PROVIDED WITH BOSSES.
APPLICATION FILED APR. 12, 1910.
996,355.
Patented June 27, 1911.
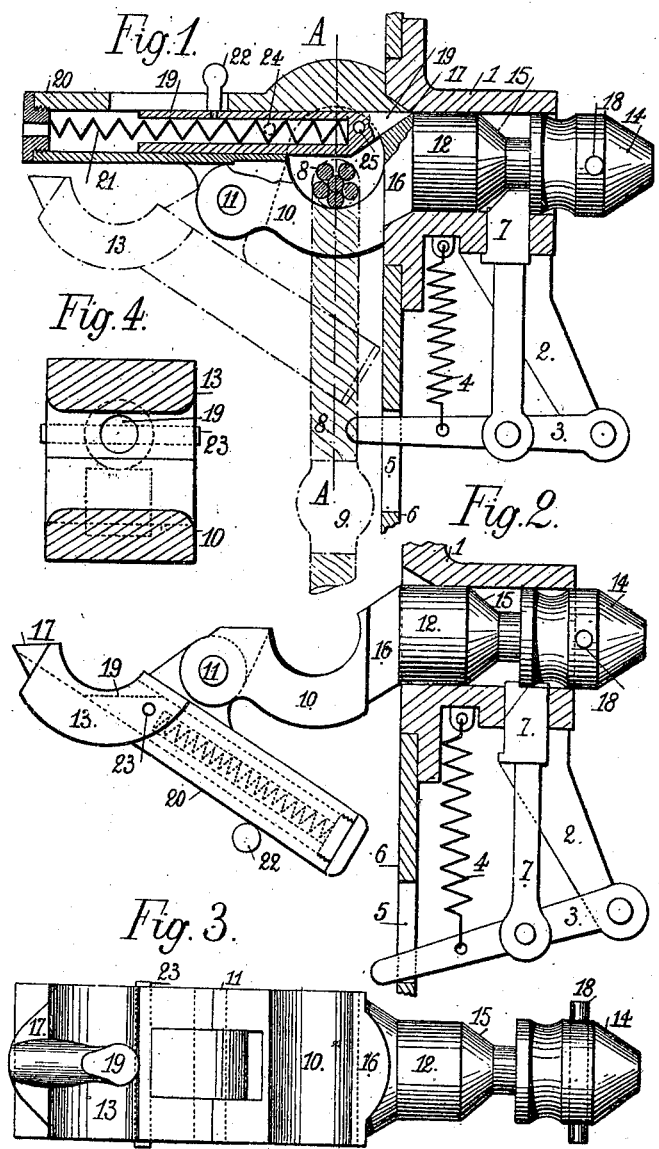
Witnesses:
M. V. Lowe
S. V. Caffrey
Inventor:
Giuseppe Matricardi
by Mitford C. Massie
his Attorney.

UNITED STATES PATENT OFFICE.

GIUSEPPE MATRICARDI, OF PALLANZA, ITALY, ASSIGNOR TO SOCIÉTÉ HARLE & CIE., OF PARIS, FRANCE, A CORPORATION OF FRANCE.

APPARATUS FOR CONNECTING ARTICLES TO BE TRANSPORTED TO A TRAVELING ROPE OR CHAIN PROVIDED WITH BOSSES.

996,355. Specification of Letters Patent. Patented June 27, 1911.

Application filed April 12, 1910. Serial No. 555,085.

*To all whom it may concern:*

Be it known that I, GIUSEPPE MATRICARDI, of Pallanza, Italy, engineer, have invented a new and useful Improvement in Apparatus for Connecting Articles to be Transported to a Traveling Rope or Chain Provided with Bosses, which improvement is fully set forth in the following specification.

This invention has for its object means whereby a rope or chain, provided with knobs or bosses, can be allowed to pass freely through mechanism capable of attachment to any article to be transported, or whereby the bosses can be instantaneously connected to the mechanism and thus to the article. Apparatus of this type can be made to render great services in many industries which involve the transport of heavy objects and also for naval purposes, such as laying and raising submarine mines.

The apparatus comprises a sleeve fixed to the load which engages the tail of an eye adapted to receive the rope or chain, the bosses on the rope normally slipping freely through the eye. The eye is formed of two members hinged together, and opened for the purpose of allowing the rope to be inserted; the members are maintained closed when the tail of the eye is pushed home into the fixed sleeve, in which position it is retained. A bolt with which the eye is provided, is adapted to restrict the size of the eye for the purpose of preventing the free passage of the bosses, thus connecting the load to the rope.

In the accompanying illustrative drawings: Figure 1 is a partial section of the complete apparatus, the size of the eye being shown restricted by the bolt. Fig. 2 is a side elevation, the eye being shown open for the insertion of the rope. Fig. 3 is a plan of the open eye, and Fig. 4 is a section on the line A—A of Fig. 1.

1 is a sleeve fixed to some article, for example a submarine mine; the sleeve 1 carries an arm 2 to which is jointed a lever 3, kept in position by a spring 4. The lever 3, whose end engages in a slot 5 formed in the article 6, controls a catch 7 which normally passes through a hole in the sleeve 1.

8 is a rope provided with bosses 9. The eye, through which the rope 8 passes, is kept closed by means of the sleeve 1. For this purpose, the eye is formed of two members 10 and 13, hinged at 11; the fixed member 10 carries a tail piece 12 engaging with the sleeve 1.

The tail 12 is provided with a conical portion 14, which, on being inserted into the sleeve 1, pushes back the catch 7 which again coming forward by reason of the spring 4, engages in the circular groove 15 of the tail, thus preventing the tail 12 from being withdrawn, while allowing it to turn freely in the sleeve. The tail is also provided with a preferably conical portion 16, completed by a projection 17 on the movable member 13, so that when the eye is home in the sleeve 1 and retained by the catch 7, its two members are held together. When it is desired to open the eye, it is therefore necessary to withdraw the catch 7 and partially at least to withdraw the tail 12 from the sleeve 1. A pin 18, with which the tail 12 is preferably provided after its insertion in the sleeve, prevents its complete withdrawal from the sleeve.

When the hinged member 13 of the eye is open (Figs. 2 and 3), the rope 8 can be placed upon the circular portion of the fixed member 10. The member 13 is then turned upon its hinge 11 and the whole is pushed into the sleeve 1 in order to keep the eye closed. As the inside diameter of the eye is greater than that of the bosses 9 on the rope 8, the bosses normally pass through freely. In order to reduce the size of the eye for the purpose of hitching on the load, the eye is provided with a bolt 19 placed within an extension 20 and pushed outward by a spring 21. The bolt 19, which can be drawn back by means of a knob 22, may be retained in this position by a pin 23 passed through holes 24 in the member 13 and a hole 25 in the bolt.

So long as the bolt 19 is retained in its rearward position, the bosses 9 on the rope 8 can pass freely through the eye, but so soon as the pin 23 is removed, the bolt is pushed out by the spring 21 and the next following boss can no longer pass through the eye; the rope or chain then exerts its force upon the eye and consequently upon the article to be moved. When the bolt 22 is drawn back (or if the lever 3 be lowered), thus freeing the movable member 13, the load is again liberated from the rope 8, for the bosses 9 are now free to pass through the eye.

When the apparatus is employed to exert a pull upon a weight placed under water, threaded upon a rope or chain provided with bosses, as is the case with the anchors of submarine mines for example, the pin 23 may comprise or be composed of a substance slowly soluble in water. While dropping the weight into the water, the rope or chain on which they are threaded passes freely through the various eyes; but after a certain time, the pins 23 being dissolved or sufficiently weakened to yield to the pressure of the springs 21, the bolts 19 are pushed forward and the rope or chain 8 exerts its pull.

Having now particularly described and ascertained the nature of my said invention and in what manner the same is to be performed, I declare that what I claim is:

1. Apparatus for connecting articles to be transported to a traveling rope provided with bosses comprising a hinged eye sufficiently large to allow the bosses to pass through it, means, such as a bolt, for restricting the aperture of the eye, means for keeping the eye closed and means for connecting the eye to the load, substantially as described.

2. Apparatus of the character described, comprising a hinged eye, means for maintaining said eye closed, a member adapted to project into and to restrict the aperture through said eye, means for holding said member away from such aperture, and means for attaching said eye to a load.

3. Apparatus of the character described, comprising a hinged eye, means for maintaining said eye closed, a member adapted to project into and to restrict the aperture through said eye, resilient means adapted to actuate said member, a water-soluble pin holding said member away from such aperture, and means for attaching said eye to a load.

4. Apparatus of the character described, comprising a hinged eye, a member projecting from said eye, a sleeve within which such projecting member is slidable, a catch adapted to limit the movement of said member in said sleeve, a spring-actuated member adapted to enter and to restrict the aperture through said eye, and a detent preventing said spring-actuated member from entering said eye.

5. Apparatus of the character described, comprising a hinged eye, means for maintaining said eye closed, a member adapted to project into and to restrict the aperture through said eye, a bolt mounted at one side of said eye and adapted to project across the aperture thereof, a spring tending to move said bolt toward said aperture, and a pin holding said bolt away from said aperture against said spring.

In testimony whereof I have signed this specification in the presence of two subscribing witnesses.

GIUSEPPE MATRICARDI.

Witnesses:
 H. C. COXE,
 C. DE MESTRAL.

---

Copies of this patent may be obtained for five cents each, by addressing the "Commissioner of Patents. Washington, D. C."